United States Patent [19]

Hsu

[11] Patent Number: 4,490,276
[45] Date of Patent: Dec. 25, 1984

[54] LIQUID CRYSTAL ADMIXTURES INCLUDING CHLORO-CYANOPHENYL SUBSTITUTED BENZOATES

[75] Inventor: Ying-Yen Hsu, Los Altos, Calif.

[73] Assignee: Merck Patent Gesellschaft mit beschrankter Haftung, Darmstadt, Fed. Rep. of Germany

[21] Appl. No.: 420,168

[22] Filed: Sep. 20, 1982

[51] Int. Cl.³ .......................... C09K 3/34; G02F 1/13
[52] U.S. Cl. .......................... 252/299.61; 252/299.5; 252/299.67; 252/299.65; 252/299.63; 350/350 R
[58] Field of Search .......................... 252/299.61, 299.67, 252/299.63, 299.65, 299.5; 350/350 R

[56] References Cited

U.S. PATENT DOCUMENTS 4,017,416  4/1977  Inukai et al. .................. 252/299.65
4,130,502 12/1978  Eidenschink et al. .......... 252/299.63
(List continued on next page.)

FOREIGN PATENT DOCUMENTS 19665 12/1980 European Pat. Off. ........ 252/299.63
53-76984 7/1978 Japan .............................. 252/299.65
(List continued on next page.)

Primary Examiner—Teddy S. Gron
Attorney, Agent, or Firm—Millen & White

[57] ABSTRACT

Disclosed are liquid crystal admixtures for electrooptical use including from about 17 wt. % to about 24 wt. % of phenyl dioxanylbenzoate compounds having the structural formula

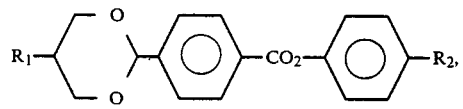

from about 6 wt. % to about 10 wt. % of 3-chloro-4-cyanophenyl benzoate compounds having the structural formula

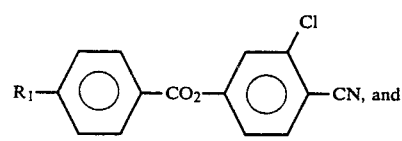

and
from about 20 wt. % to about 40 wt. % of cyanophenyl dioxane compounds having the structural formula

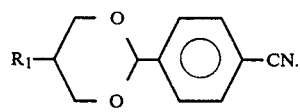

Preferred admixtures include from about 8 wt. % to about 10 wt. % of 3-chloro-4-cyanophenyl dioxanylbenzoate compounds having the structural formula

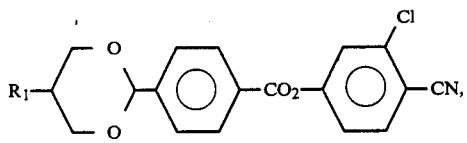

from about 24 wt. % to about 25 wt. % of phenyl cyclohexanecarboxylate compounds having the structural formula

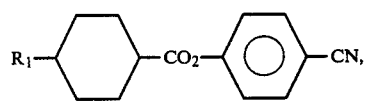

up to about 8 wt. % of 3-chloro-4-cyanophenyl phenylbenzoate compounds having the structural formula

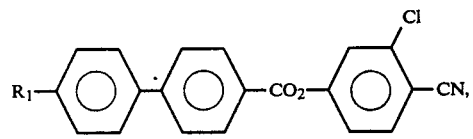

up to about 20 wt. % of cyclohexyl dioxane compounds having the structural formula

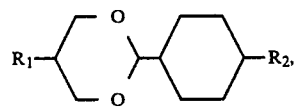

up to about 20 wt. % of cyanophenyl cyclohexane compounds having the structural formula

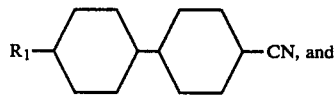

and
up to about 8 wt. % of 3-chloro-4-cyanophenyl cyclohexylbenzoate compounds having the structural formula

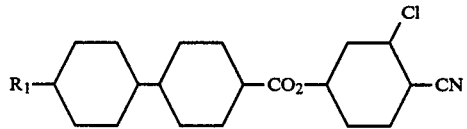

where each $R_1$ and $R_2$ may be the same or different alkyl groups having 1 to 7 carbon atoms. All mixtures include approximately 0.1 wt. % of cholesteryl nonanoate. These admixtures exhibit low threshold voltage levels.

11 Claims, No Drawings

LIQUID CRYSTAL ADMIXTURES INCLUDING CHLORO-CYANOPHENYL SUBSTITUTED BENZOATES

BACKGROUND OF THE INVENTION

The present invention relates to liquid crystal mixtures which are suitable for use in electrooptical displays, especially of the multiplexed type.

It is known to use nematic liquid crystal admixtures in electrooptic displays. Such displays include the twisted nematic multiplexible display. Such display is well known to those skilled in the art.

In the utilization of nematic liquid crystal mixtures in electrooptic displays, it is desirable to minimize the electrical potential applied to the liquid crystal mixtures for the purpose of reducing the power requirements of the display device and still obtain the desired effect. Derivatives of the compounds disclosed in U.S. Pat. No. 4,313,878 issued to Hsu and assigned to the Timex Corporation, U.S. Pat. No. 4,198,312 issued to Sato et al. and assigned to Daineppon Inc. & Chemicals, Inc. and Hitachi, Ltd. and copending U.S. Pat. application, Ser. No. 422,048, filed Sept. 23, 1982, have been mixed together with 4-methoxybenzylidene 4'-n-butylaniline (MBBA) to provide admixtures exhibiting low threshold voltages due substantially to the difference in positive dielectric anisotropy of the compounds in each of the mixtures.

Therefore, it is an object of this invention to produce novel liquid crystal mixtures that exhibit low threshold voltages.

It is another object of the invention to minimize the electrical potential applied to the liquid crystal mixture without reducing the desired electrooptical effect.

SUMMARY OF THE INVENTION

According to the present invention, there is provided liquid crystal admixtures including at least about 17 wt. % of phenyl dioxanylbenzoate compounds, at least about 6 wt. % of 3-chloro-4-cyanophenyl benzoate compounds and at least about 20 wt. % of cyanophenyl dioxane compounds with other liquid crystalline compounds including up to about 8 wt. % of 3-chloro-4-cyanophenyl phenylbenzoate compounds, at least about 24 wt. % of phenyl cyclohexanecarboxylate compounds, at least about 8 wt. % of 3-chloro-4-cyanophenyl dioxanylbenzoate compounds, up to about 20 wt. % each of cyclohexyl dioxane compounds and cyanophenyl cyclohexane compounds and up to about 8 wt. % of 3-chloro-4-cyanophenyl cyclohexylbenzoate compounds.

Attached to the fourth carbon atom of the dioxane moiety in the phenyl dioxanylbenzoate compounds, cyanophenyl dioxane compounds and 3-chloro-4-cyanophenyl dioxanylbenzoate compounds are alkyl groups having 1 to 8 carbon atoms. Attached to the fourth carbon atom of the cyclohexane moiety in the phenyl cyclohexanecarboxylate compounds, cyclohexyl dioxane compounds, cyanophenyl cyclohexane compounds and 3-chloro-4-cyanophenyl cyclohexylbenzoate compounds are alkyl groups having 1 to 8 carbon atoms. Attached to the fourth carbon atom of the benzene ring distal to the CN group in the 3-chloro-4-cyanophenyl benzoate and phenylbenzoate compounds are alkyl groups having 1 to 8 carbon atoms. Attached to the fourth carbon atom of the cyclohexyl ring in the cyclohexyldioxane compounds and distal to the dioxane moiety in the phenyl dioxanylbenzoate compounds are alkyl groups having 1 to 8 carbon atoms.

The nature of the invention may be better understood by the following representative embodiments which are included to illustrate the invention without limiting its scope which is defined in the claims.

DESCRIPTION OF SPECIFIC EMBODIMENTS

The general class of phenyl dioxanylbenzoate compounds useful in admixtures of the invention has the general formula

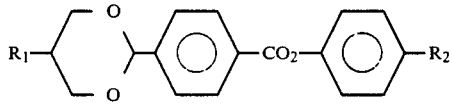

where $R_1$ and $R_2$ are the same or different alkyl groups. These phenyl dioxanylbenzoates are more fully described in U.S. Pat. No. 4,313,878 issued to Hsu. The general class of cyanophenyl dioxanes useful in admixtures of the invention has the general formula

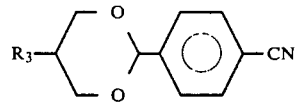

where $R_3$ is alkyl. These cyanophenyl dioxanes are more fully described in U.S. Pat. No. 4,322,354 issued to Sorkin. The general class of cyanophenyl cyclohexane compounds useful in admixtures of the invention has the general formula

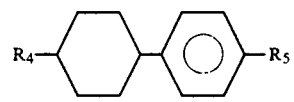

where $R_4$ is alkyl and $R_5$ is alkyl or cyano. The general class of phenyl cyclohexanecarboxylates useful in admixtures of the invention has the general formula

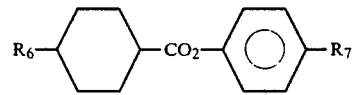

where $R_6$ is alkyl and $R_7$ is alkyl or cyano. The general class of 3-chloro-4-cyanophenyl substituted benzoates compounds useful in admixtures of the invention has the general formula

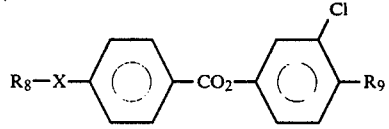

where X is a dioxane, cyclohexane or benzene ring and $R_8$ and $R_9$ are the same or different alkyl groups having 1 to 8 carbon atoms. These 3-chloro-4-cyanophenyl substituted benzoates are more fully described in copending U.S. Pat. application Ser. No. 422,048, filed Sept. 23, 1982, of common assignee herewith. Each of the above mentioned texts are incorporated herein by reference. The 3-chloro-4-cyanophenyl substituted benzoates are characterized by their increasing positive dielectric anisotropic effect on liquid crystals.

The above mentioned compounds when mixed in the proportions indicated in the following examples are especially preferred for multiplexible low voltage electrooptic displays. The following admixtures have been prepared and exhibit the indicated crystal to nematic (CN) and nematic to isotropic (NI) transition temperatures:

EXAMPLE 1

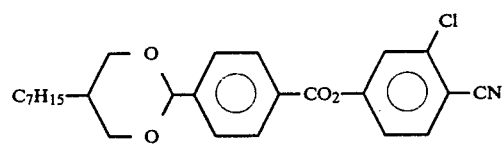

3-Chloro-4-cyanophenyl 4'-(5-n-heptyl-1,3-dioxan-2-yl) benzoate 8 wt. %

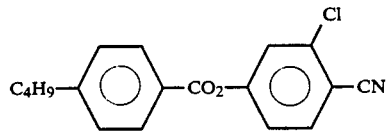

3-Chloro-4-cyanophenyl 4'-n-butylbenzoate 8 wt. %

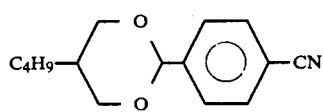

2-(4-cyanophenyl)-5-n-butyl-1,3-dioxane 40 wt. %

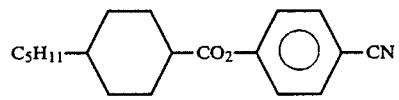

4-n-Cyanophenyl 4'-n-pentylcyclohexanecarboxylate 24 wt. %

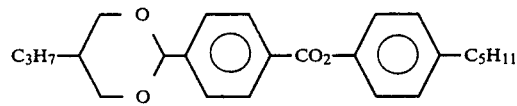

4-n-Pentylphenyl 4'-(5-n-propyl-1,3-dioxan-2-yl) benzoate 20 wt. %

CN −10° C.
NI 73.5° C.

EXAMPLE 2

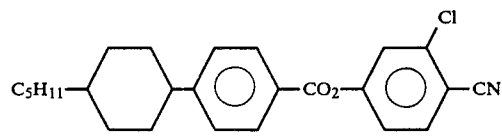

3-Chloro-4-cyanophenyl 4'-(5-n-pentylcyclohexyl) benzoate 8 wt. %

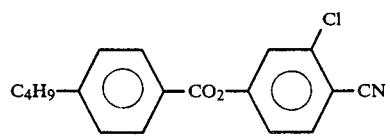

3-Chloro-4-cyanophenyl 4'-n-butylbenzoate 10 wt. %

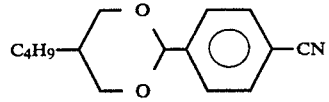

2-(4-Cyanophenyl)-5-n-butyl-1,3-dioxane 40 wt. %

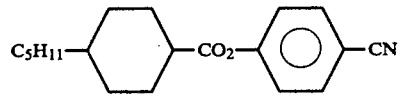

4-n-Cyanophenyl 4'-n-pentylcyclohexanecarboxylate 25 wt. %

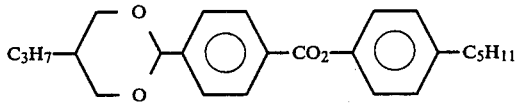

4-n-Pentylphenyl 4'-(5-n-propyl-1,3-dioxan-2-yl) benzoate 17 wt. %

CN −10° C.
NI 68.1° C.

EXAMPLE 3

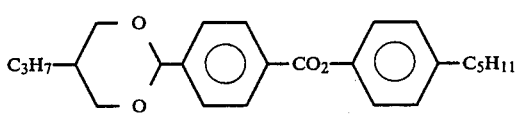

3-Chloro-4-cyanophenyl 4'-(5-n-hexyl-1,3-dioxan-2-yl) benzoate 8 wt. %

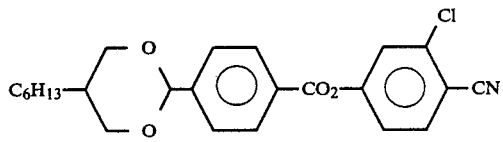

3-Chloro-4-cyanophenyl 4'-n-butylbenzoate 8 wt. %

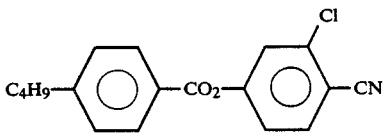

2-(4-Cyanophenyl)-5-n-butyl-1,3-dioxane 40 wt. %

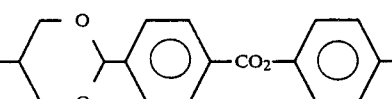

4-n-Cyanophenyl 4'-n-pentylcyclohexanecarboxylate 24 wt. %

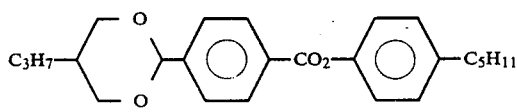

4-n-Pentylphenyl 4'-(5-n-propyl-1,3-dioxan-2-yl) benzoate 20 wt. %

CN −16° C.
NI 72.8° C.

EXAMPLE 4

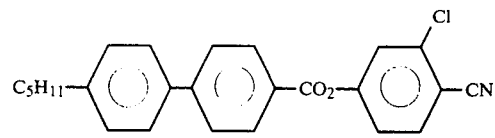

3-Chloro-4-cyanophenyl 4'-(5-n-pentylphenyl) benzoate 8 wt. %

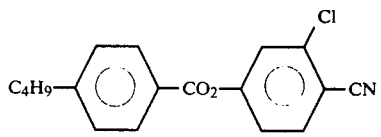

3-Chloro-4-cyanophenyl 4'-n-butylbenzoate 8 wt. %

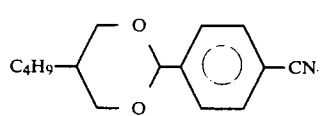

2-(4-Cyanophenyl)-5-n-butyl-1,3-dioxane 40 wt. %

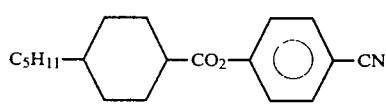

4-n-Cyanophenyl 4'-n-pentylcyclohexanecarboxylate 24 wt. %

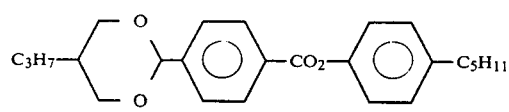

4-n-Pentylphenyl 4'-(5-n-propyl-1,3-dioxan-2-yl) benzoate 20 wt. %

CN −6° C.
NI 72.5° C.

EXAMPLE 5

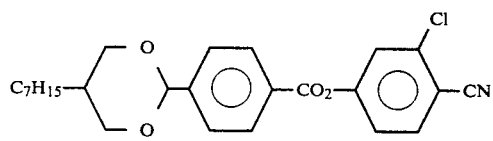

3-Chloro-4-cyanophenyl 4'-(5-n-heptyl-1,3-dioxan-2-yl) benzoate 10 wt. %

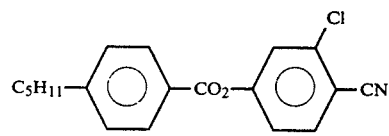

3-Chloro-4-cyanophenyl 4'-n-pentyl benzoate 6 wt. %

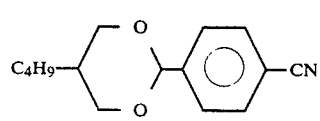

2-(4-Cyanophenyl)-5-n-butyl-1,3-dioxane 20 wt. %

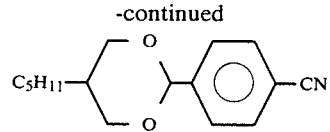

2-(4-Cyanophenyl)-5-n-pentyl-1,3-dioxane 20 wt. %

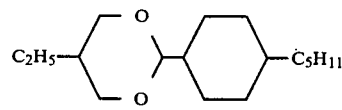

2-(4-n-Pentylcyclohexyl)-5-ethyl-1,3-dioxane 20 wt. %

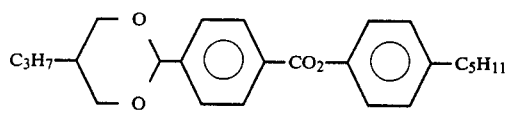

4-n-Pentylphenyl 4'-(5-n-propyl-1,3-dioxan-2-yl) benzoate 24 wt. %

CN −8° C.
NI 69.3° C.

EXAMPLE 6

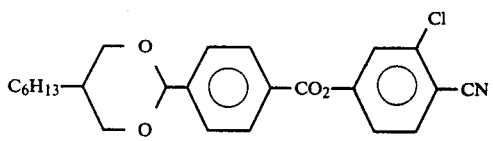

3-Chloro-4-cyanophenyl 4'-(5-n-hexyl-1,3-dioxan-2-yl) benzoate 9 wt. %

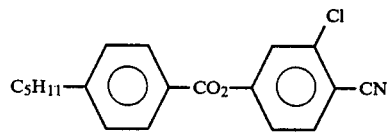

3-Chloro-4-cyanophenyl 4'-n-pentylbenzoate 7 wt. %

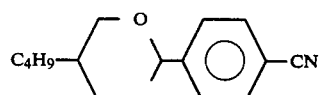

2-(4-Cyanophenyl)-5-n-butyl-1,3-dioxane 38 wt. %

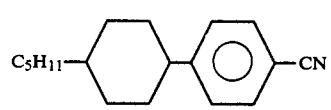

trans-4-n-Pentyl-(4-cyanophenyl) cyclohexane 28 wt. %

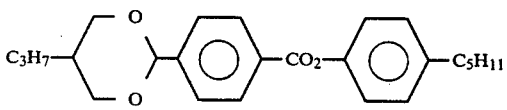

4-n-Pentylphenyl 4'-(5-n-propyl-1,3-dioxan-2-yl) benzoate 18 wt. %

CN −5° C.
NI 64.4° C.

Each mixture in Examples 1 through 6 include approximately 0.1 wt. % of cholesteryl nonanoate, a chiral compound.

The above mixtures exhibit low threshold voltages. The voltages for each example mixture at ten percent, $V_{10}$, and ninety percent, $V_{90}$, saturation are summarized below in Table 1.

TABLE 1

| Mixture Threshold Voltages | | |
| --- | --- | --- |
| Examples | $V_{10}$ (volts) | $V_{90}$ (volts) |
| 1 | 1.16 | 1.70 |
| 2 | 1.15 | 1.75 |
| 3 | 1.16 | 1.72 |
| 4 | 1.17 | 1.76 |
| 5 | 1.23 | 1.70 |
| 6 | 1.13 | 1.67 |

The percent saturation voltages were measured using a liquid crystal cell having a thickness of 10 μm and treated with a polyimide homogeneously aligning agent on the interior surfaces to provide an extremely low tilt angle to the liquid crystal molecules. The mixtures of the present invention exhibit high speed response to low operating voltages since the liquid crystal threshold voltage is low at low transition temperatures.

Furthermore, the compound of Example 2 was tested in 10 micron thick liquid crystal cells, each having a high (rate)/low (rate) SiO evaporation angle. The transmission versus voltage characteristics were determined such that the threshold voltages at 10% and 90% saturation are about 0.7 and 1.0 respectively. This indicates that the mixtures exhibit high speed response at low operating voltages of approximately 1.5 volts at a properly selected cell spacing and tilt angle.

What is claimed is:

1. A nematic liquid crystal admixture for an electrooptic display wherein said mixture comprises
    (a) at least about 17 weight % of at least one compound selected from the group having the formula:

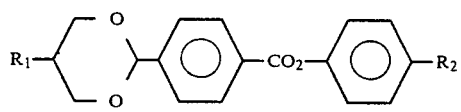

wherein $R_1$ is an alkyl group and $R_2$ is an alkyl group;
    (b) at least about 6 weight % of at least one compound selected from the group having the formula:

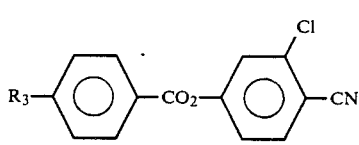

wherein $R_3$ is an alkyl group; and
    (c) at least about 20 weight % of at least one compound selected from the group having the formula:

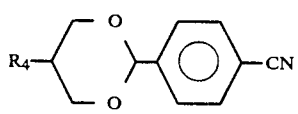

wherein $R_4$ is an alkyl group;
and wherein all alkyl groups are of 1–8 carbon atoms.

2. The admixture of claim 1 wherein said admixture further comprises at least about 8 weight % selected from the group having the formula:

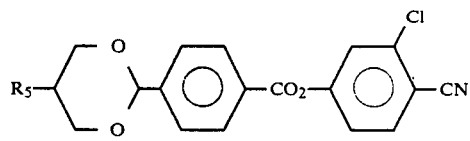

wherein $R_5$ is an alkyl group of 1–8 carbon atoms.

3. The admixture of claim 2 wherein said admixture further comprises up to about 20 weight % of at least one compound selected from the group having the formula:

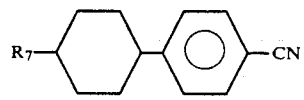

wherein $R_7$ is an alkyl group of 1–8 carbon atoms.

4. The admixture of claim 1 or 2 wherein said admixture further comprises at least about 24 weight % of at least one compound selected from the group having the formula:

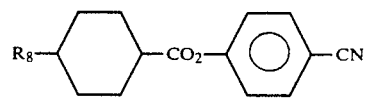

wherein $R_8$ is an alkyl group of 1–8 carbon atoms.

5. The admixture of claim 4 wherein said admixture further comprises up to about 8 wt % of at least one compound selected from the group having the formula:

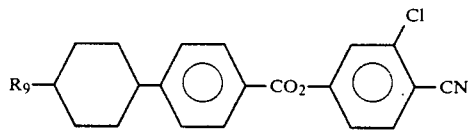

wherein $R_9$ is an alkyl group of 1–8 carbon atoms.

6. The admixture of claim 2 wherein said admixture further comprises up to about 20 wt % of at least one compound selected from the group having the formula:

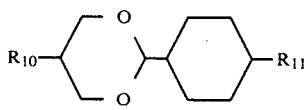

wherein $R_{10}$ and $R_{11}$ are the same or different alkyl groups, each of 1–8 carbon atoms.

7. The admixture of claim 4 wherein said admixture further comprises up to about 8 wt % of at least one compound selected from the group having the formula:

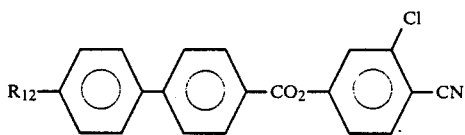

wherein $R_{12}$ is an alkyl group of 1–8 carbon atoms.

8. A mixture of claim 1 wherein the amounts of the compounds are about:

(a) 17–24 weight percent (b) 6–10 weight percent (c) 20–40 weight percent.

9. A mixture of claim 8 further comprising about 8–10 weight percent of at least one compound selected from the group having the formula:

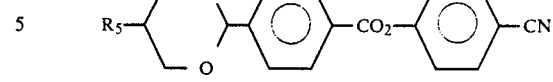

wherein $R_5$ is an alkyl group of 1–8 carbon atoms.

10. A mixture of claim 8 further comprising about 24–25 weight percent of at least one compound selected from the group having the formula:

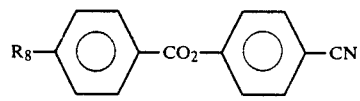

wherein $R_8$ is an alkyl group of 1–8 carbon atoms.

11. A mixture of claim 9 further comprising about 24–25 weight percent of at least one compound selected from the group having the formula:

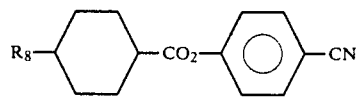

wherein $R_8$ is an alkyl group of 1–8 carbon atoms.

* * * * *